United States Patent [19]

Costa

[11] Patent Number: 4,826,740

[45] Date of Patent: May 2, 1989

[54] PROCESS FOR GENERATING ELECTRICAL ENERGY BY OXIDATION OF A SOLID FUEL IN LIQUID METAL

[76] Inventor: Bruno Costa, Via Petrarca 31C/11, Napoli, Italy

[21] Appl. No.: 96,034

[22] Filed: Sep. 11, 1987

[30] Foreign Application Priority Data

Sep. 15, 1986 [IT] Italy ................................ 21705 A/86

[51] Int. Cl.[4] .............................................. H01M 8/12
[52] U.S. Cl. ......................................... 429/17; 429/20; 429/33; 429/34; 429/102; 429/104
[58] Field of Search .................. 429/17, 19, 20, 30, 429/13, 16, 19, 101, 102, 103, 104, 105, 34, 38, 39

[56] References Cited

U.S. PATENT DOCUMENTS

| 460,122 | 9/1891 | Edison ................................ 429/17 |
| 3,192,070 | 6/1965 | Tragert et al. ...................... 429/17 |
| 3,214,296 | 10/1965 | Smatko ........................... 429/101 X |
| 3,400,054 | 9/1968 | Ruka et al. ....................... 429/17 X |

*Primary Examiner*—Anthony Skapars
*Attorney, Agent, or Firm*—Herbert Dubno

[57] ABSTRACT

Electrical energy is generated by feeding oxygen through a solid electrolyte wall in contact with a bath of molten metal, the positive electrode being provided on the surface of this wall defining the gas space while the negative electrode is provided in the melt. Carbon monoxide released when the oxygen reacts with dissolved carbon in the melt is collected for further use and the carbon in the melt is replenished in the form of solid carbon particles which can be entrained into the melt in carbon monoxide gas.

20 Claims, 2 Drawing Sheets

PROCESS FOR GENERATING ELECTRICAL ENERGY BY OXIDATION OF A SOLID FUEL IN LIQUID METAL

FIELD OF THE INVENTION

My present invention relates to a process for the generation of electrical energy by oxidation of a solid fuel in a liquid metal medium and, more particularly, to a process which utilizes molten metal, especially molten iron, as a carbon carrier for the oxidation process.

BACKGROUND OF THE INVENTION

It is known to generate electrical energy by carrying out chemical reactions between two substances. In most cases, such substances react in a medium having electrolytic properties, i.e. in an electrolyte, and the reaction produces direct electric current in a circuit connected between two electrodes in contact with the electrolytic medium.

An example of such processes is the fuel cell wherein a fuel, usually of a gaseous nature, is caused to react with a comburant, usually oxygen, through a wall of the fuel cell or pile having the properties of a solid electrolyte. On opposite faces of this wall, having the properties of a solid electrolyte, electrodes are applied forming the terminals from which the electric current is delivered to the external circuit.

The large-scale application of fuel cells and has, however, been limited because of the need for a high-cost fuel in a gaseous state, either obtained by the gasification of solid fossil fuels or obtained by the distortion of petroleum or recovered directly, e.g. as natural gas. In all cases, it is fossil carbon which reacts with the oxygen either directly or in the form of a carbon compound.

To the best of my understanding, a highly effective low-cost electrochemical process for the generation of electrical energy from solid fuel containing fossil carbon has not been described in the art.

It would be highly advantageous, therefore, to be able to utilize solid fuels consisting of fossil carbon or containing fossil carbon directly in the generation of electrical energy without first having to subject the fuel to costly treatment.

The production of electric energy electrochemically is particularly of interest since it allows the energy liberated in chemical reactions to be directly transformed into electrical energy without requiring the secondary production of heat through the use of thermodynamic transformation cycles and without involving the limitations in efficiency known to characterize thermodynamic cycles.

It is also desirable to be able to produce in a chemical and efficient manner carbon monoxide which has a variety of uses. For example, carbon monoxide and hydrogen can form the highly desirable synthesis gas which is useful in a variety of chemical synthesis reactions.

OBJECTS OF THE INVENTION

It is the principal object of the present invention to provide an improved process for generating electrical energy utilizing a solid fuel whereby the drawbacks of earlier techniques can be obviated and the process is capable of being carried out efficiently on a large scale.

Another object of the invention is to provide a method of electrochemically generating electrical energy which also is capable of producing highly useful products.

Still another object of this invention is to provide a method of generating electrical energy and liberating recoverable and useful amounts of carbon monoxide.

It is also an object of the invention to provide an improved apparatus for carrying out the process.

SUMMARY OF THE INVENTION

These objects and others which will become apparent hereinafter are attained, in accordance with this invention, in a process which utilizes a molten metal bath as a carbon carrier and a solid fuel consisting of fossil carbon or containing fossil carbon which is introduced into the melt to replenish carbon from the melt which is transformed into carbon monoxide and electrochemically generates electrical energy.

According to the invention, oxygen is fed to a gas space separated by a thin wall of a material with the properties of a solid electrolyte from the bath of molten metal which is in contact with the wall, the oxygen traversing the wall to react on the liquid metal side thereof with the carbon of the bath.

The solid fuel-containing carbon is supplied to the bath and a negative electrode is immersed in the bath and forms one terminal of an electric power-consuming circuit or load whose other terminal is connected to a positive electrode applied to a surface of the wall which is not in contact with the molten metal bath. While direct electric current is thereby generated, carbon monoxide is produced which is liberated from the bath and collected or recovered in accordance with the invention.

Advantageously, the bath consists essentially of molten iron containing carbon in solution. The material forming the wall and having properties of a solid electrolyte is preferably composed of a refractory oxide or combination of oxides, especially $ZrO_2$, $ThO_2$, $HfO_2$, $CaO$, $MgO$ and $Y_2O_3$ and combinations thereof, pure, in mixtures, as mixed oxides, or as impurities in other refractories. Best results are obtained when the material consists of or contains $ZRO_2$.

Advantageously, the temperature of the molten metal bath is maintained between 1400° and 1700° C. The oxygen is supplied at a pressure of 0 to 10 bar, preferably between 3 and 5 bar.

The solid fuel containing carbon is introduced into the bath by entrainment of the small particles of pulverized fossil carbon in an inert gas used as a carrier fluid. The carrier gas is preferably carbon monoxide and the fuel can be injected in the carrier gas into the melt either at a lower portion thereof or through the surface of the melt via a cooled lance.

The oxygen is supplied to the gas space either as pure oxygen or as air or oxygen-enriched air, the wall being selectively permeable only by the oxygen in its ionic form.

I have found that the process can be made thermally disautonomous, i.e. any heat lost from the bath can be replaced by the in situ generation of thermal energy, if a supplemental supply of oxygen into the bath directly is effected. This oxygen, which does not need to permeate the wall, generates heat by combustion of excess carbon dissolved in the bath to maintain the operational temperature thereof and compensate for any thermal losses in the system.

In one embodiment of the apparatus of the invention, the wall forms part of a cell which is immersed in molten metal in a single vessel containing same.

In another embodiment, a first reactor contains the bath of molten metal and oxygen is fed to pipes whose walls are composed of the aforedescribed solid electrolyte material immersed in the bath. Several electrodes are also immersed in the bath while other electrodes are in contact with inner surfaces of the pipes to enable electrical energy to be drawn form the system. The first reactor can also be provided with means for recovering the evolved carbon monoxide.

A second reactor is connected with the first and means is provided for circulating the molten bath between the two reactors. The second reactor is provided with the means for supplying the solid fuel to the bath, if desired for generating heat, for introducing supplemental oxygen into the bath to burn off some excess carbon.

Where the electrodes are provided in electrode couples, the couples can be connected electrically in series and the external utilization circuit can be connected across the series connection of the electrodes.

The recovered carbon monoxide can be used for chemical synthesis, in metallurgical processes or the like and, if desired, at least some of the electric energy which is produced can be used for the electrolysis of water to produce hydrogen, the hydrogen being combined with the carbon monoxide for chemical synthesis. In addition, or alternatively, at least some of the carbon monoxide can be burned to operate the thermodynamic cycle for the additional production of electrical energy.

BRIEF DESCRIPTION OF THE DRAWINGS

The above and other objects, features and advantages of the present invention will become more readily apparent from the following description, reference being made to the accompanying drawing in which.

SPECIFIC DESCRIPTION

Figure 1:
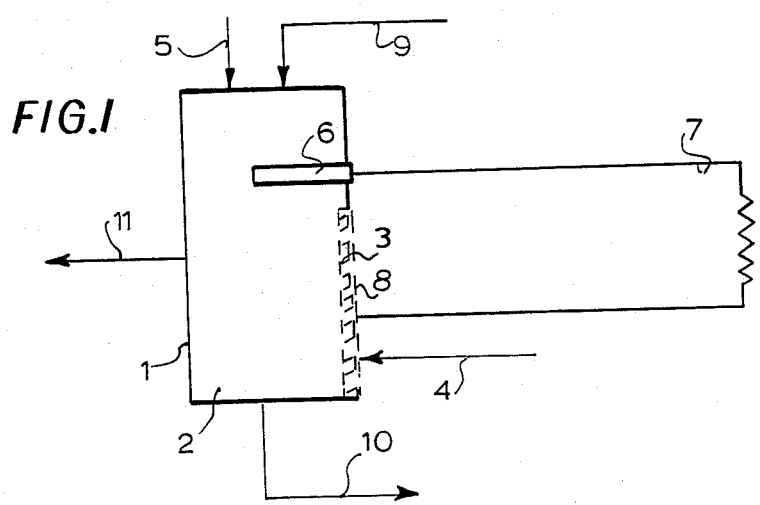
FIG. 1 is a schematic flow diagram illustrating the principles of the invention.

In FIG. 1, I have shown a reactor 1 containing a ferrous melt 2 represented only diagrammatically in contact with molten iron 2, one or more walls 3 are provided which are composed of solid electrolytes as described, for example, zirconium oxide.

Oxygen is fed to the reactor through the wall 3 as represented by the arrow 4 and a flow of solid fossil carbon entrained in a gas is introduced into the molten metal as shown at 5.

An electrode 6 is immersed in the molten metal 2 and is connected as the negative pole of an external utilization circuit 7 represented as a resistive load. The positive pole of the circuit is an electrode 8 which is oxygen permeable and in contact with the gas side of the wall 3. Additional oxygen may be supplied at 9 to the bath 2 to maintain the temperature of the melt by reaction with excess carbon. Slag is removed as shown at 10 and recovered gases 11 are discharged, mostly in the form of carbon monoxide.

In accordance with the principles of the invention, oxygen in the gas space and supplied at 4 to the reactor diffuses through and is adsorbed on the surfaces of the solid electrolyte and reduction of the oxygen takes place in this region in accordance with the relationship:

$$O_{(ads)} + 2e^- = O^= \tag{1}$$

The thus produced ions of oxygen migrate across the wall of solid electrolyte 3 and come into contact with the bath of molten iron where the reaction:

$$O^= = O_{(sol)} + 2e^- \tag{2}$$

takes place, producing oxygen in solution.

Practically immediately the dissolved oxygen reacts with dissolved carbon in accordance with the relationship:

$$C_{(sol)} + O_{(sol)} = CO \tag{3}$$

The carbon monoxide gas is liberated from the molten metal and is collected and discharged at 11. The partial pressure of oxygen is held low in the molten bath by virtue of the latter reaction.

The negative charge which is released in reaction (2) is conducted by the molten bath to the electrode 6 and charge balance is effected by the passage of an electric current through the external circuit 7 in accordance with the rate of the reaction.

The ion transport inside the refractory oxides constituting the solid electrolyte appear to be a result of defects or impurities in the crystalline structure which has gaps through which the ionic particles can move. Typical compounds having such behavior are the refractory oxides $ZrO_2$, $ThO_2$, $HfO_2$, $CaO$, $MgO$, $Y_2O_3$ and $Al_2O_3$ which can be in combination with one another. A preferred refractory material is $ZrO_2$ containing as impurities $CaO$ and $Y_2O_3$.

The oxygen supplied by the flow 9 serves to maintain the temperature of the bath by combustion of available carbon therein in accordance with the known reactions of decarburization thereby compensating for heat losses.

From the reactions (1), (2), (3), it will be apparent that a potential difference is established whereby carbon monoxide is produced which can be converted into carbon dioxide, yielding thermal energy, and electrical energy is produced. The carbon monoxide can also be used in chemical synthesis or metallurgical processes as mentioned above.

When the combined energy yield of the reactions (1), (2) and (3) is 29, 290 Kcal/kg mol, the voltage produced is defined by the relationship:

$$V = \frac{RT}{4F} \ln(p'O_2/p''O_2)$$

where $p'O_2$ is the pressure of the oxygen supplied to the outside of the wall 3, $p''O_2$ is the partial pressure of the oxygen dissolved in the molten bath 2, R is the universal gas constant, T is the absolute temperatue and V is given in volts.

With a pressure $p'O_2$ of 1 bar and $p''O_2$ of $3.0 \times 10^{-13}$ bar at a temperature of 1600° K, one obtains 1.16 volts.

It can be estimated that for a power yield of 1 MW, a carbon consumption of 352.8 kg/h and an oxygen consumption of 329.22 m3/h (STP) are required.

When the carbon monoxide is burned to form carbon dioxide and is used to drive a gas turbine, secondary electrical energy can be recovered in a thermodynamic cycle, adding to the electrical efficiency of the system.

It can be calculated that the overall efficiency of the process is substantially analogous to a Carnot cycle operating at 2200° C. Consequently, the system of the invention gives a remarkably higher efficiency by comparison with actual cycles utilizing present fuels.

Use of a molten metal bath also permits impurities contained in the solid fuel, i.e. the fossil carbon, to be recovered in the form of liquid slag. Such impurities, therefore, are not liberated into the gas and the carbon monoxide gas which is thus obtained has a high degree of purity.

Sulfur remains in the slag and thus is not released into the environment as is characteristic of combustion processes for the generation of electrical energy.

Figure 2:
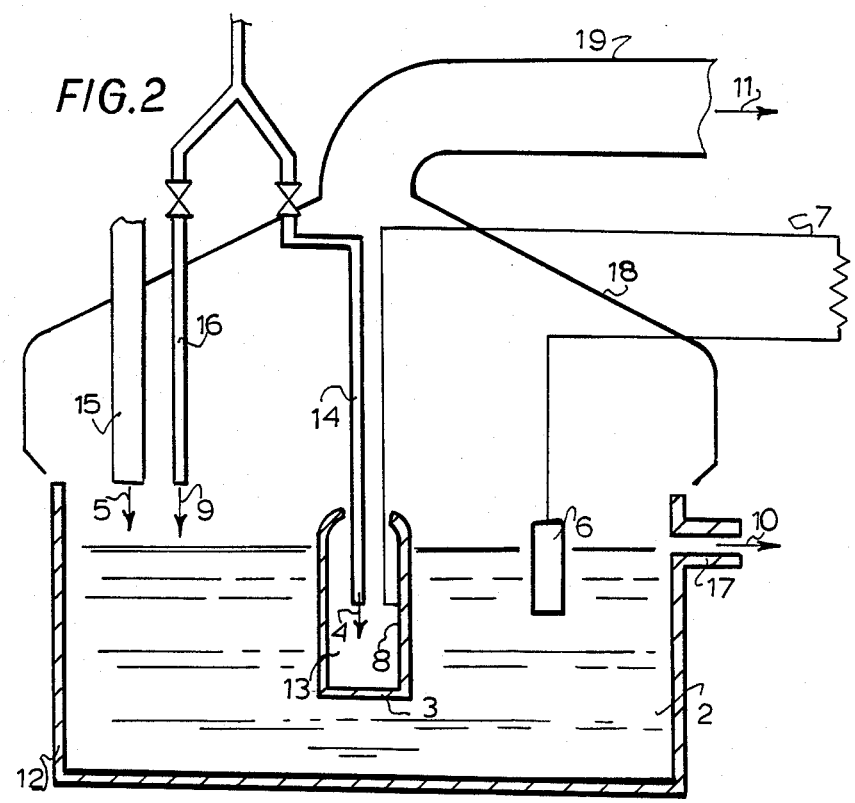
FIG. 2 is a section through a reactor for carrying out the process.

FIG. 2 shows an embodiment of the invention in which the reactor 12 can be analogous to those used for the decarburization of cast iron or similar metallurgical processes and likewise contains a bath of molten ferrous metal. In this bath, a cell 13 is immersed which has walls made of a material having the characteristics of a solid electrolyte and oxygen is fed into this cell at 4 via the pipe 14.

A lance 15, which can be of the water-cooled type can be held at a short distance from the surface of the bath to inject a stream 5 of carbon particles entrained in a gas which is inert with respect to reaction with the molten iron bath, preferably carbon monoxide.

Such a flow can also be introduced into the bath by tuyeres opening below the level of the melt or through bottom-blowing openings or lateral lances. The carbon can also be introduced in free fall onto the surface of the melt. In the latter case, the carbon may be provided in particle sizes up to several centimeters.

Figure 3:
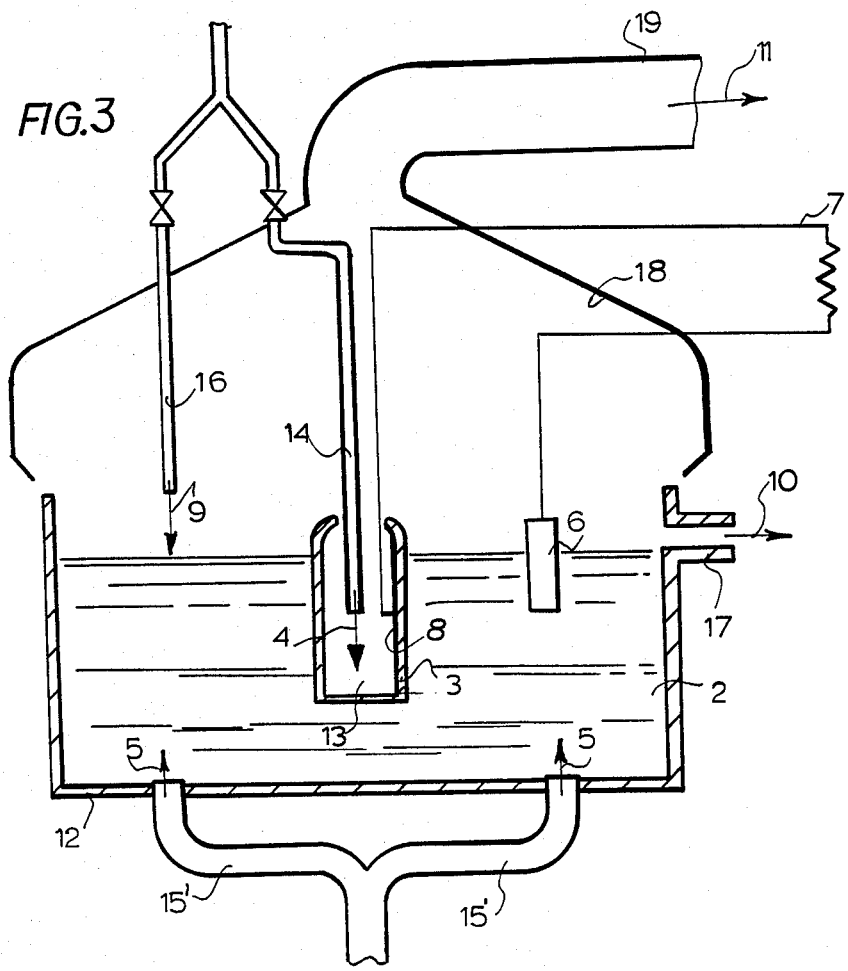
FIG. 3 is a view similar to FIG. 2 illustrating another embodiment.

In FIG. 3, for example, the fossil carbon is shown to be supplied through pipes 15' in the form of powdered carbon entrained in the carrier gas carbon monoxide.

In all cases, entrainment of the carbon in the carrier gas results in a high efficiency of fossil carbon dissolution in the bath and elimination of impurities in the slag.

A further pipe 16 can direct a jet of oxygen onto the bath 2 directly to burn off available carbon and produce the heat required for maintaining the temperature of the bath.

The slag is discharged at 10 via the pipe 17 and at the top of the furnace, a hood 18 or similar element can be provided to collect the evolved carbon monoxide directing it at 11 through the pipe 19 for further use.

Figure 4:
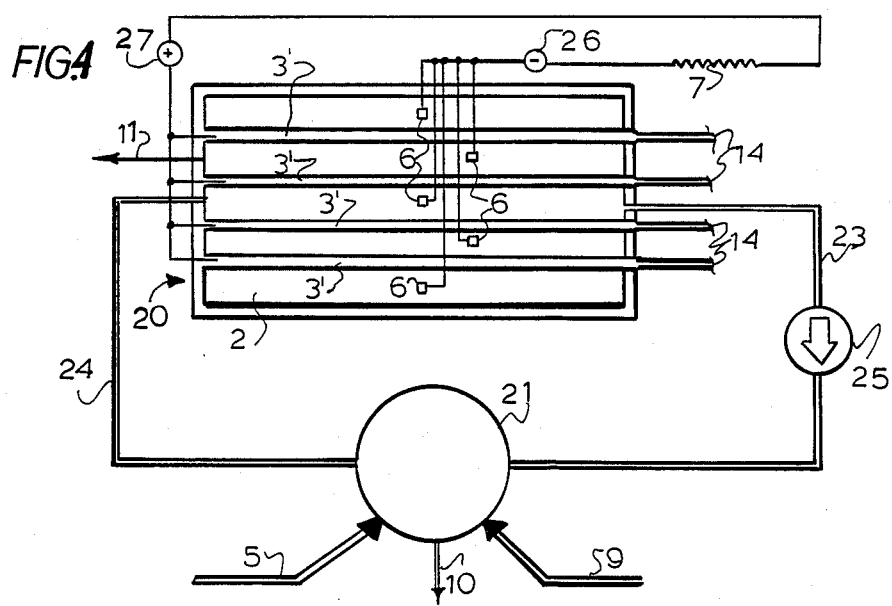
FIG. 4 is a flow diagram illustrating principles of the invention as applied to a two-reactor system.

In the embodiment of FIG. 4, a two-reactor system for carrying out the invention is shown. The reactors 20 and 21 are interconnected by piping 23, 24 lined with refractory material and including an electromagnetic induction pump 25 to effect circulation of the molten iron bath.

The first reactor 20 receives several electrodes connected to the negative pole or terminal 26 of the utilizer circuit 7. Between 2 lateral walls of the reactor 20 there are provided a number of pipes 3' whose interior surfaces bound the gas space which is supplied with oxygen via the pipes 14. The oxygen can be supplied as pure oxygen or air.

The oxygen reacts via the mechanism of the reactions (1), (2), (3) as described to generate an electric current in the circuit 7 between the negative terminal 26 and a positive terminal 27 whose electrodes are located within the pipes 3'.

Pipe 11, collects liberated carbon monoxide produced in the reactor 20.

The reactor 21 serves for the recarburization of the bath 2 by the supply of fossil carbon 5 as previously described. Slag is extracted at 10 from the reactor 21 and additional oxygen can be supplied at 9 to this reactor to maintain the temperature of the bath. Otherwise the system of FIG. 4 operates in the same manner as the systems previously described.

This embodiment has certain advantages over the embodiment of FIGS. 1–3. For example it allows a more convenient arrangement of the elements 3' composed of the solid electrolyte and of the electrode 6. It makes it possible to connect cells of paired opposites and negative electrodes in series to build up the voltage supplied to the utilizer circuit.

The reactor 20 can be a smaller reactor with its volume to ensure optimal dissolution of carbon in the melt and mixing of the solid fuel with the melt.

The elimination of the solid slag at the reactor 21 prevents slag from deposition on the surfaces of the solid electrolyte. Maintenance is also simplified.

While the use of iron is preferred for the molten metal bath, it is also possible to use lead, copper, nickel, silver, cobalt or mixtures thereof with one anther or with iron.

The electrodes 6 forming the anodes can be made of iron and can be cooled or of a consumable type.

I claim:

1. A process for the production of electrical energy, comprising the steps of:
   (a) immersing in a bath of molten metal a wall of material resistant to dissolution by said molten metal and permeable by oxygen so that said wall separates a gas space from said molten metal in contact with said wall;
   (b) introducing into said gas space gaseous oxygen, thereby forming oxygen in a form which enables the oxygen to traverse said wall;
   (c) introducing into said bath of molten metal a solid fuel containing carbon which reacts with oxygen which traverses said wall to produce gaseous carbon monoxide which is evolved from said bath;
   (d) drawing an electrical current from a positive electrode applied to a surface of said wall in contact with said gas space and a negative electrode in contact with said bath of molten metal and supplying the electrical current to an electrical energy consumer connected across said electrodes; and
   (e) recovering the carbon monoxide produced in step (c).

2. The process defined in claim 1 wherein said bath consists essentially of molten iron in which carbon is disolved.

3. The process defined in claim 1 wherein said wall is composed at least in part of a refractory oxide.

4. The process defined in claim 3 wherein said wall is composed of an oxide selected from the group which consists of $ZrO_2$, $ThO_2$, $HfO_2$, $CaO$, $MgO$, $Y_2O_3$ and $YbO_3$ and mixtures, mixed oxides and other refractories containing same as impurities.

5. The process defined in claim 4 wherein said wall is composed of a material which contains mainly $ZrO_2$ $ZrO_2$.

6. The process defined in claim 1 wherein said molten metal bath is maintained at a temperature of substantially 1400° C. to 1700° C. and the pressure at which oxygen is supplied to said space is between 0 and 10 bar.

7. The process defined in claim 6 wherein said pressure is between 3 and 5 bar.

8. The process defined in claim 1 wherein said solid fuel is injected into said bath in the form of carbon-containing particles which are entrained into said bath in a carrier fluid inert to reaction with the bath.

9. The process defined in claim 8 wherein said carrier fluid is carbon monoxide and said particles entrained by the carbon monoxide are introduced from below into the bath.

10. The process defined in claim 1 wherein the oxygen introduced to said gas space in step (b) is introduced in the form of air and said wall is composed of a solid electrolyte permeable only by ionic oxygen from said space.

11. The process defined in claim 1, further comprising the step of maintaining thermal autonomy of the process by generating heat from said fuel to balance heat loss from said bath.

12. The process defined in claim 11 wherein the thermal autonomy of the process is maintained at least in part by injecting oxygen into said bath directly to thereby burn excess carbon dissolved in said bath and generate heat and carbon monoxide.

13. The process defined in claim 1 wherein said gas space is formed by immersing into said bath a cell formed by walls, permeable by oxygen said carbon monoxide is recovered by a hood overlying said bath, and slag is removed from an upper surface of said bath.

14. The process defined in claim 1 wherein said space is formed by tubes having walls permeable by oxygen and immersed in said bath in a first reactor, said oxygen being supplied to the interiors of said tubes in said first reactor, said process further comprising the step of circulating said molten metal between said first reactor and a second reactor into which said solid fuel is introduced.

15. The process defined in claim 14, further comprising the step of introducing oxygen directly into said melt in said second reactor to burn excess carbon dissolved in said melt and heat said melt.

16. The process defined in claim 1 wherein said carbon monoxide is subjected to chemical reaction for chemical synthesis, a metallurgical process or another carbon-monoxide utilization reaction.

17. The process defined in claim 16 wherein hydrogen is generated with at least part of the extracted electrical energy by electrolysis and is combined with the recovered carbon monoxide.

18. The process defined in claim 1, further comprising the step of combusting the recovered carbon monoxide for the additional generation of electrical energy in a thermodynamic cycle.

19. An apparatus for the production of electrical energy, comprising:

at least one reactor containing a bath of molten metal;

means defining a gas space in said both separated from said bath by a thin wall of a material resistant to dissolution by said molten metal and permeable by oxygen so that said wall is in contact with said molten metal;

means for introducing into said gas space gaseous oxygen, thereby forming oxygen in a form in which the oxygen traverses said wall;

means for introducing into said bath of molten metal a solid fuel containing carbon which reacts with oxygen which traverses said wall to produce gaseous carbon monoxide which is evolved from said bath;

electricity-generating means including a positive electrode applied to a surface of said wall in contact with said gas space and a negative electrode in contact with said bath of molten metal and means connected with said electrodes for drawing current from said electrodes and supplying the electrical current to an electrical energy consumer; and means for recovering the carbon monoxide produced.

20. The apparatus defined in claim 19 wherein a first reactor receiving said bath is provided with said gas space and said electrode, a second reactor receiving said bath is provided with said means for introducing said solid fuel into said bath, and said apparatus further comprises means for circulating said bath between said reactors.

* * * * *